United States Patent [19]

Rozmus

[11] Patent Number: 4,498,169
[45] Date of Patent: Feb. 5, 1985

[54] MULTIACCESS BROADCAST COMMUNICATION SYSTEM

[75] Inventor: John M. Rozmus, Lilburn, Ga.

[73] Assignee: Scientific Atlanta, Inc., Atlanta, Ga.

[21] Appl. No.: 475,015

[22] Filed: Mar. 14, 1983

[51] Int. Cl.³ .............................................. H04J 6/00
[52] U.S. Cl. .................................... 370/85; 340/825.5
[58] Field of Search ............................ 370/85, 94, 95; 340/825.5, 825.51

[56] References Cited

U.S. PATENT DOCUMENTS

| 4,210,780 | 7/1980 | Hopkins et al. | 370/85 |
| 4,320,502 | 3/1982 | de Veer | 370/85 |
| 4,432,088 | 2/1984 | Frankel | 370/85 |

OTHER PUBLICATIONS

"An Introduction to Local Area Networks", by Clark et al., Proc. of the IEEE, vol. 66, No. 11, Nov. 1978, pp. 1497–1516.

"Multiaccess Protocols in Packet Communication Systems", by Tobagi, IEEE Trans. on Communications, vol. COM-28, No. 4, Apr. 1980, pp. 468–488.

"Local-Area Networks, Part 1-Technology", by Kotelly, EDN, Feb. 17, 1982, pp. 109–122.

Primary Examiner—Douglas W. Olms
Attorney, Agent, or Firm—Martin LuKacher

[57] ABSTRACT

A time division multiple access communication system utilizing a transmission medium, such as the broadband cable of a CATV system having a retransmission facility at the head end thereof to which messages from stations at nodes spaced successively along the cable are transmitted upstream to the head end and broadcast downstream and upstream on different frequency channels. The messages are transmitted in frames addressed to different stations or in sequential order with portions near the beginning thereof representing the length of the data contained therein. The stations at successive nodes are scheduled to transmit successively and are given access to the cable at a time after the start of reception of a preceding message equal or greater than the difference between the duration thereof and twice the propagation time from the station scheduled to transmit to the head end of the cable. Message length adaptive multiple access to the cable without collisions and efficient utilization of the cable is thereby obtained.

7 Claims, 3 Drawing Figures

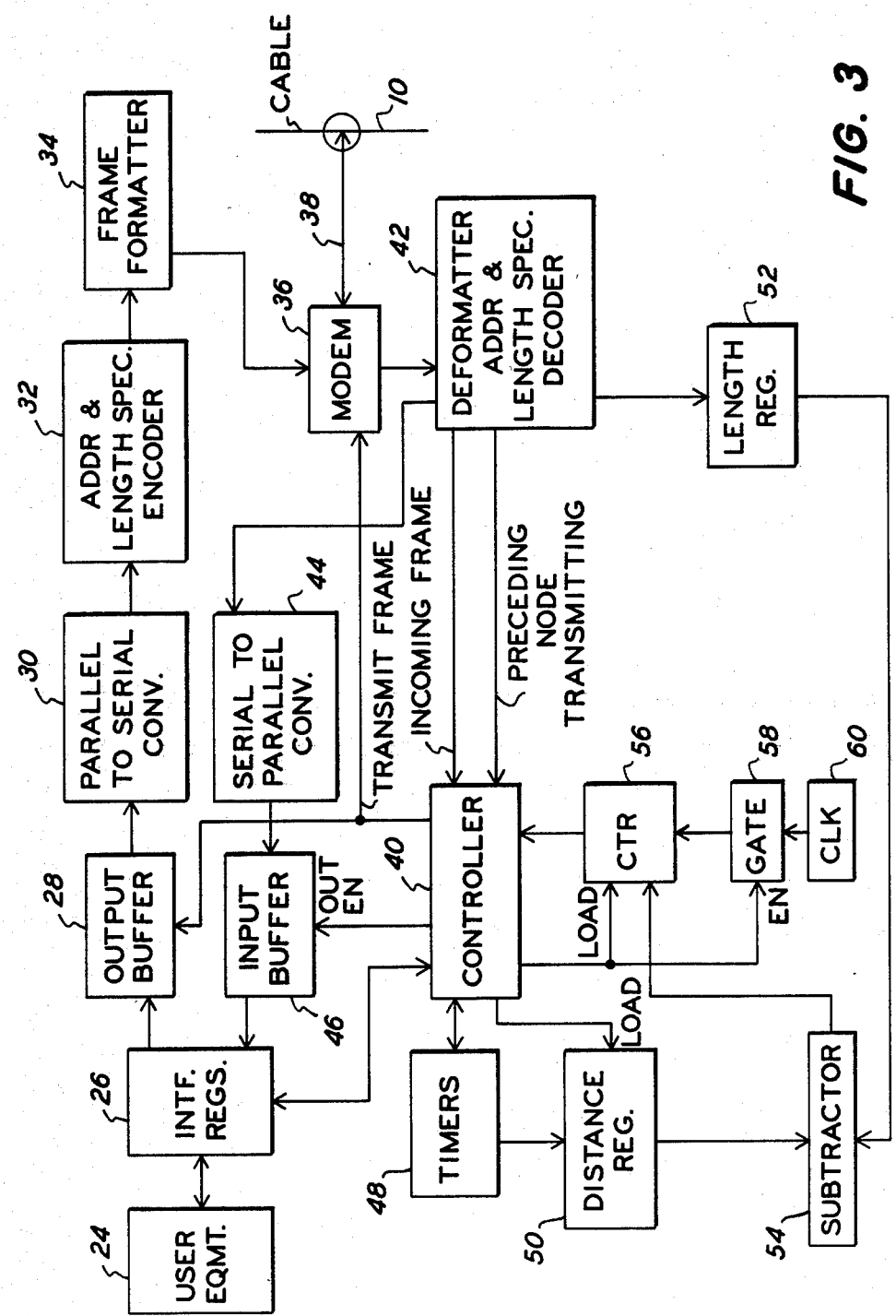

MULTIACCESS BROADCAST COMMUNICATION SYSTEM

DESCRIPTION

The present invention relates to communication systems in which a multiplicity of stations have multiaccess to a transmission medium having a retransmission facility which receives messages from the stations and broadcasts these messages, as for selective or multiple reception by the stations, and particularly to a time division multiple access (TDMA) communication system having a transmission medium affording separate channels for transmissions upstream to a retransmission facility and broadcast transmission downstream to all of the stations; the stations being connected to the transmission medium at successive nodes spaced from each other along the transmission medium away from the retransmission facility.

The invention is especially suitable for use in so-called local area networks utilizing the cable of a CATV distribution system as the transmission medium with a retransmission facility at the head end of the cable for receiving messages transmitted from the stations when they are given access to the cable and broadcasting such messages for reception and either multiple or selective use by the stations. The stations may contain computer controlled or so-called intelligent terminals for the processing, generation, and display of the messages.

Various protocols have been suggested for governing multiaccess to a transmission medium, such as a broadband cable, for governing sharing of the cable without interference or to accommodate interference or collisions of messages on the cable. Reference may be had to the following articles for further information with respect to such protocols as have been proposed: Clark, Pogran and Reed, An Introduction to Local Area Networks, Proceedings of the IEEE, Vol. 66, No. 11, 1497 (1978); Tobagi, Multiaccess Protocols in Packet Communications Systems, IEEE Transactions on Communications, Vol. Com-28, No. 4,468 (1980); Kotelly, Local Area Networks, Electronic Design News, 109, Feb. 17, 1982.

Since there can be thousands of stations subscribing to the medium, time is precious. It is the feature of this invention to conserve time for efficient utilization and throughput of messages over the medium which may be implemented without complexity and at low cost in systems having the topology where reverse or upstream transmissions from individual stations at successive nodes may be broadcast by retransmission to all of the stations. Such a network being essentially available in broadband cable TV (CATV) installations.

The various multiaccess protocols which have been proposed are either complex in design or waste transmission time. For example, polling systems wherein each station has access to the cable for a fixed time is wasteful, especially where only a part of the allotted time is used. Other systems which use complex multiaccess protocols like Carrier Sense Multiple Access with Collision Avoidance (CSMA/CD) are wasteful in a topology, such as is available with a CATV network, since a transmission by one station is not detected by the other until after a significant delay. Thus, the detection of collisions is delayed and the efficiency of utilization of the cable may be severely degraded under heavy load conditions. Token passing protocols have been proposed; however, a station cannot begin transmission until it receives the token at the end of a preceding transmission. This wastes transmission time equal to the propagation delay from the station scheduled to transmit to the retransmission facility at the head end of the cable and back thereto.

It is the principal object of the invention to provide an improved communication system which operates in accordance with a multiaccess broadcast protocol so as to obtain efficient utilization of the transmission medium and which is not complex and expensive to implement.

It is another object of the present invention to provide an improved multiaccess broadcast communication system which is adapted to use CATV or similar broadband transmission facilities wherein messages from stations connected to the cable are retransmitted from the head end thereof and broadcast to all of the stations.

It is a still further object of the present invention to provide an improved multiaccess broadcast communication system which enables messages of various length to be transmitted without collisions and with efficient utilization of the transmission medium.

Briefly described, a multiaccess communication system in accordance with the invention has a multiplicity of communication stations which are connected at a multiplicity of nodes disposed successively along a multichannel transmission medium having means also connected to the transmission medium for receiving messages transmitted in one of the channels along the medium from the nodes and retransmitted by broadcast of the messages over another of the channels to all of the nodes. Multiple access is provided to the medium from the stations for transmission of the messages without collisions by the use of means in each of the stations for formatting each of the messages with a portion in the heading thereof which represents the length of the message. Each station has means for transmitting the message along one of the channels in the reverse or upstream direction to the retransmitting means which may be at the head end of the transmission medium. Means are provided in each of these stations, which are responsive to the length portion of a preceding message on the other channel which is broadcast downstream in the forward direction to all of the stations, for providing access to the reverse channel of the medium after a delay from the start of receipt of the preceding message equal to or greater than the duration of the preceding message minus twice the propagation time over the medium between the node at which the station is connected and the retransmission means. The system therefore operates in accordance with a multiaccess broadcast protocol which enables messages of various length to be transmitted and allows stations scheduled to transmit access to the medium without waiting for the passage of its node by the entire preceding message as in token passing or for fixed delays to accommodate worst case conditions.

The foregoing and other objects, features and advantages of the invention as well as a presently preferred embodiment thereof will become more apparent from a reading of the following description in connection with the accompanying drawings in which:

FIG. 3 is a block diagram illustrating a typical station of the system shown in FIG. 1.

Figure 1:
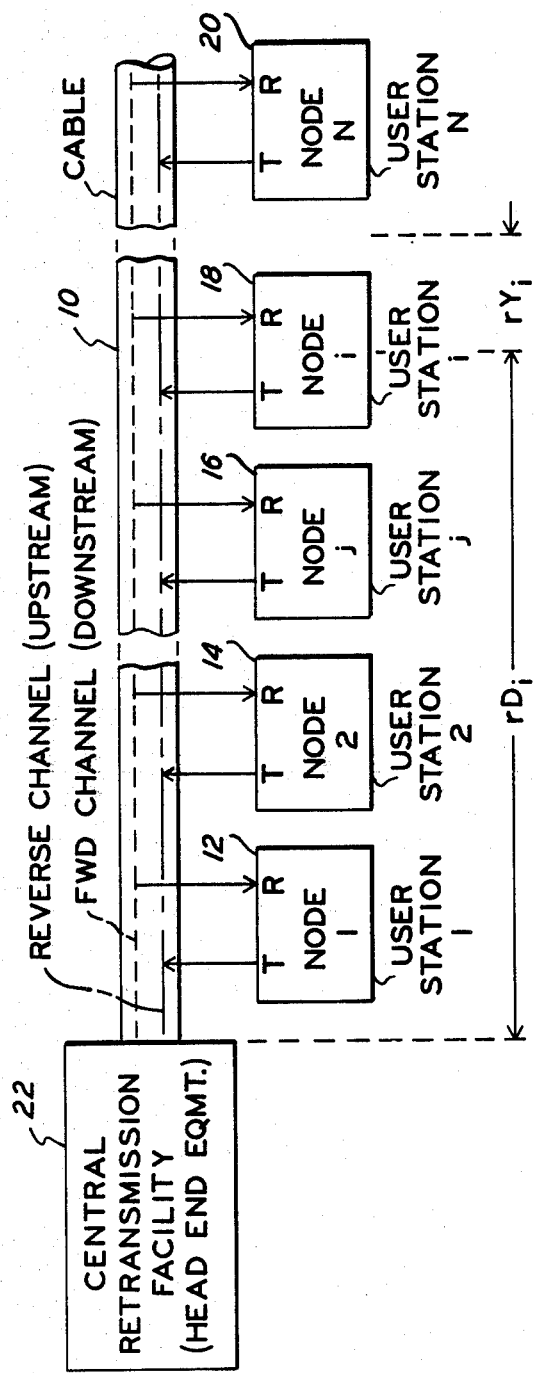
FIG. 1 is a schematic diagram of a communication system embodying the invention wherein five of a multiplicity, N of user stations, stations Nos. 1, 2, j, i and N, are illustrated.

Referring first to FIG. 1, there is shown a cable 10 such as the coaxial cable of a CATV system. At successive drops or nodes on the cable 10 there are connected a multiplicity of user stations 12, 14, 16, 18 and 20. These user stations are shown transmitting on a reverse channel and receiving on a forward channel. These channels may be separate frequency channels which are frequency multiplexed on the cable. Each channel may be a broadband channel which is not used for other purposes, such as the transmission of television program signals as are conventionally transmitted on CATV cables. The electrical signals in each channel are, of course, carried by the same coaxial cable. The line made up of long and short dashes showing the reverse channel and of short dashes showing the forward channel merely illustrates that two separate channels are used for the forward (downstream) and reverse (upstream) transmissions.

At the head end of the cable 10 is a central retransmission facility 22 which may be part of the head end equipment of the cable system. The topology of the network is thus that of a rooted tree structure with the head end retransmission facility 22 at the root. The stations at all of the nodes can hear forward transmissions which are broadcast over the forward channel. The stations do not hear the reverse transmission over the reverse channel. The stations 12 to 20 operate in accordance with a length adaptive broadcast protocol wherein each message is transmitted in frames. The stations are scheduled to transmit successively in an arbitrary order. For example, the station 12 at node 1 may be scheduled to transmit first, followed by the station 14 at node 2, followed by other stations and then by the station 16 at node j, the station 18 at node i, and other stations until the final station 20 at node N transmits. The message in each frame may include a node address with information, successive bits of which represent the node address of both the node originating the message and the node to which the message is destined. There follows a length specification which is located near the head or beginning of the message. This length specification is a portion of the message which represents the total length thereof including the length of the data which is transmitted in the frame. The frame may be of varying size depending upon how much data it contains. The mode of transmission is bi-phase, FSK or any other mode capable of transmission of digital data.

Figure 2:
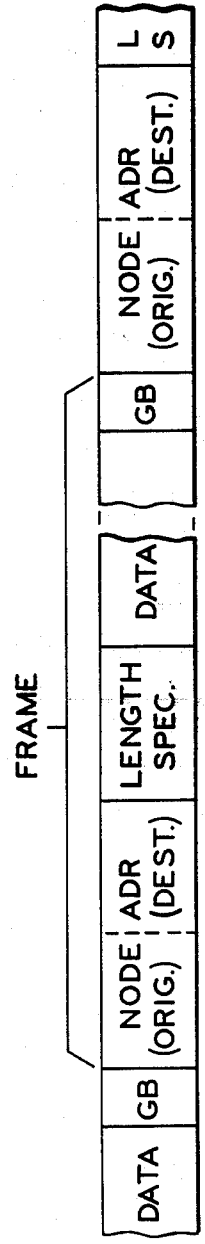
FIG. 2 is a diagram showing the format of a frame of a message which is transmitted by a station or received by a station in the system shown in FIG. 1.

Each station has stored therein, as upon system initialization, information as to the propagation delay to and from the retransmission facility 22 at the head end and its node. With information as to the propagation delay and information received from a preceding message, access to the cable can be given at a point in time where the transmission can begin without collision with a preceding message from another station while minimizing the gap of wasted transmission time (guard band time indicated as GB in FIG. 2).

Consider by way of example that the station 18 at node i is scheduled to transmit after the station 16 at node j. When the station 18 at node i receives and reads the length specification of the preceding message from station 16 at node j which arrives over the forward channel on the cable 10, the point in time for the beginning of the transmission of the message at node i from station 18 without collision is the time when $X_j$ minus $2D_i$ minus $Y_i$ is equal or less than 0, where $X_j$ is the length (the duration) of the preceding message from station 16 at node j; $d_i$ is the propagation delay from node i to the head end; and $Y_i$ is the time that elapsed from the reception of the beginning or head of the message from station 16 at station 18. FIG. 1 also utilizes the symbol r which represents the propagation velocity in the cable. It will therefore be seen in a theoretically worst case where the length specification $X_j$ is equal to 0, that $2D_i$ of transmission time can be wasted. However, the system using the length adaptive broadcast protocol can waste at most $2D_i$ of time, while token passing or the systems which utilize fixed worst case delays, always waste $2D_i$ or similar fixed periods of time. The system provided by the invention using the length adaptive broadcast protocol therefore has enhanced efficiency and throughput of information over the channel.

The stations 12 to 20 may be implemented by the system shown in FIG. 3. The user equipment 24 may be an intelligent terminal having a processor or computer which interchanges information with interface registers 26. The data to be transmitted is stored in an output buffer 28, and converted from parallel to serial form in a converter 30. The address and length specification is added to the message in an encoder 32 and formatted with error check codes which may be part of the data into frames by a formatter 34. The serial data is then transmitted to a modem 36 which is connected by way of a drop 38 to the cable 10. The transmission of data from the buffer 28 and from the modem 36 is controlled by a controller 40 which enables the buffer 28 and the modem 36 at the time the station is scheduled to transmit.

The signals received from the forward channel of the cable are translated by the modem 36 into digital signals and applied to a deformatter which includes a decoder 42 and derives the address and length spec. portions of the message. The frame is transferred to a serial to parallel converter 44 and via an input buffer 46 to the interface registers 26. The user equipment then obtains the data and operates thereon. When a frame contains the destination address of its own station, the deformatter 42 signals the controller 44 which enables the input buffer 46 to output the data in the message to the interface registers 26. The deformatter 42 also signals the controller when the incoming address and length specifications are complete and have been received.

During an initialization period or other reserved period in the protocol, the controller will cause the user equipment 24 and interface registers 26 to output a special message and simultaneously start a timer 48. When the message is received after propagation over the reverse channel, through the retransmission facility 22 and back along the forward channel of the cable 10, the timer is stopped. The value in the timer 48 represents the propagation delay ($2D_i$). Under control of an output from the controller 40 this value is stored in the distance register 50. During regular operation, the deformatter 42 scans the received messages for messages addressed to the station, for example, where the station is at node i the messages having destination addresses representing node i. The deformatter 42 is also scanning for transmissions from stations at nodes whose turn to transmit precedes it. For example, where the station is station 18 at node i, originating addresses of node j are scanned for. When a frame containing the station 16 at node j's address is detected, for example, the controller transfers the data representing the length specification from the length register 52 to a subtractor 54 which contains logic for determining the difference between the length specification and the $2D_i$ propagation time which is stored in the distance register 50. The subtractor 54 inputs this data to a down counter 56 upon occurrence of a load pulse from the controller 40. The load pulse also enables a gate 58 which applies pulses from a clock source 60 to the counter. The counter is decremented repeatedly until the count therein is less than or equal to 0. Upon detection of a 0 count, an output may be applied directly to the controller so as to enable the transmission of a frame (the transmit frame output provides the enable).

From the foregoing description it will be apparent that there has been provided an improved communication system for efficient utilization of a transmission medium through the use of a length adaptive broadcast protocol. Variations and modifications in the herein-described system, within the scope of the invention, will undoubtedly suggest themselves to those skilled in the art. Accordingly, the foregoing description should be taken as illustrative and not in a limiting sense.

I claim:

1. A communication system in which a multiplicity of communications stations are connected at a multiplicity of nodes disposed successively along a multichannel transmission medium, each of said stations having means connected to said medium for receiving messages transmitted in one of said channels along said medium from said nodes and retransmitting said messages in another of said channels to all of said nodes, for providing multiple access to said medium from said stations for the transmission of said messages without collisions, said system comprising means in each of said stations for formatting each of said messages with a portion in the heading thereof which represents the length of said message, means for transmitting said message along said one channel to said retransmitting means, means in each of said stations responsive to the length portion of a preceding received message on said other channel for providing access to said one channel of said medium after a delay from the receipt of said preceding message equal to or greater than the difference between the length of said preceding message and the propagation time in said medium from the node at which said station is connected to said retransmission means and back to said last named node.

2. The system according to claim 1 wherein said transmission medium is a broadband cable.

3. The system according to claim 2 wherein said retransmitting means is at the head end of said cable which is at the end of said cable upstream of said stations in the direction of transmission along said one channel.

4. The invention according to claim 3 wherein said formatting means also provides a message portion in the heading of each of said messages representing the address of at least one of said stations to which said message is destined, said access providing means in each of said stations including means for decoding said address and length portions of said message and providing access to said cable for each of said stations after said delay from the start of reception of said preceding message addressed thereto.

5. The system according to claim 3 wherein said stations are scheduled to transmit successively in arbitrary order, and wherein said access providing means includes means for detecting the reception of messages transmitted from the station preceding the specified station in such arbitray order, and means for providing access to said cable for said station after said delay time from the start of reception of said preceding message when it is detected as the message from the station preceding it in the arbitrary ordering.

6. The system according to claim 3 wherein said access providing means includes means for storing a signal representing twice the propagation time over the distance along said cable between said retransmission means at said head end and said station, said stored signal being the distance signal, means for storing a signal representing the length of said preceding message, and means for controlling the transmission of said message to occur at a time related to the difference between said stored distance signal and said length signal.

7. The system according to claim 6 wherein said controlling means comprises a counter, means for loading a count into said counter corresponding to the value of said difference signal, means for decrementing said counter, and means for enabling the transmission of said message when said count in said counter is equal or less than 0.

* * * * *